United States Patent
Minoshima et al.

(10) Patent No.: US 12,549,679 B2
(45) Date of Patent: Feb. 10, 2026

(54) IMAGE CAPTURING APPARATUS, METHOD FOR CONTROLLING THE SAME, AND STORAGE MEDIUM

(71) Applicant: CANON KABUSHIKI KAISHA, Tokyo (JP)

(72) Inventors: Toshio Minoshima, Kanagawa (JP); Toshihiro Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/612,742

(22) Filed: Mar. 21, 2024

(65) Prior Publication Data
US 2024/0323315 A1 Sep. 26, 2024

(30) Foreign Application Priority Data
Mar. 23, 2023 (JP) .................. 2023-046967

(51) Int. Cl.
| | | |
|---|---|---|
| H04N 5/77 | (2006.01) | |
| H04N 5/76 | (2006.01) | |
| H04N 9/804 | (2006.01) | |
| H04N 9/82 | (2006.01) | |
| H04N 21/854 | (2011.01) | |
| H04N 23/667 | (2023.01) | |
| H04N 23/67 | (2023.01) | |
| H04N 23/69 | (2023.01) | |

(52) U.S. Cl.
CPC .................................. H04N 5/77 (2013.01)

(58) Field of Classification Search
None
See application file for complete search history.

(56) References Cited

U.S. PATENT DOCUMENTS

| | | | |
|---|---|---|---|
| 7,831,127 B2 | 11/2010 | Wilkinson | |
| 2002/0131764 A1* | 9/2002 | David | ................. G11B 27/031 |
| 2006/0233534 A1 | 10/2006 | Haupt | |

FOREIGN PATENT DOCUMENTS

JP 2020161954 A 10/2020

* cited by examiner

Primary Examiner — Hung Q Dang
(74) Attorney, Agent, or Firm — Canon U.S.A., Inc. IP Division

(57) ABSTRACT

An image capturing apparatus capable of capturing a moving image generates metadata to be recorded at least in units of frames and records the metadata generated and a moving image data in one file. The image capturing apparatus performs control such that the metadata having the same content generated by the image capturing apparatus is recorded in a plurality of different regions of the one file.

7 Claims, 11 Drawing Sheets

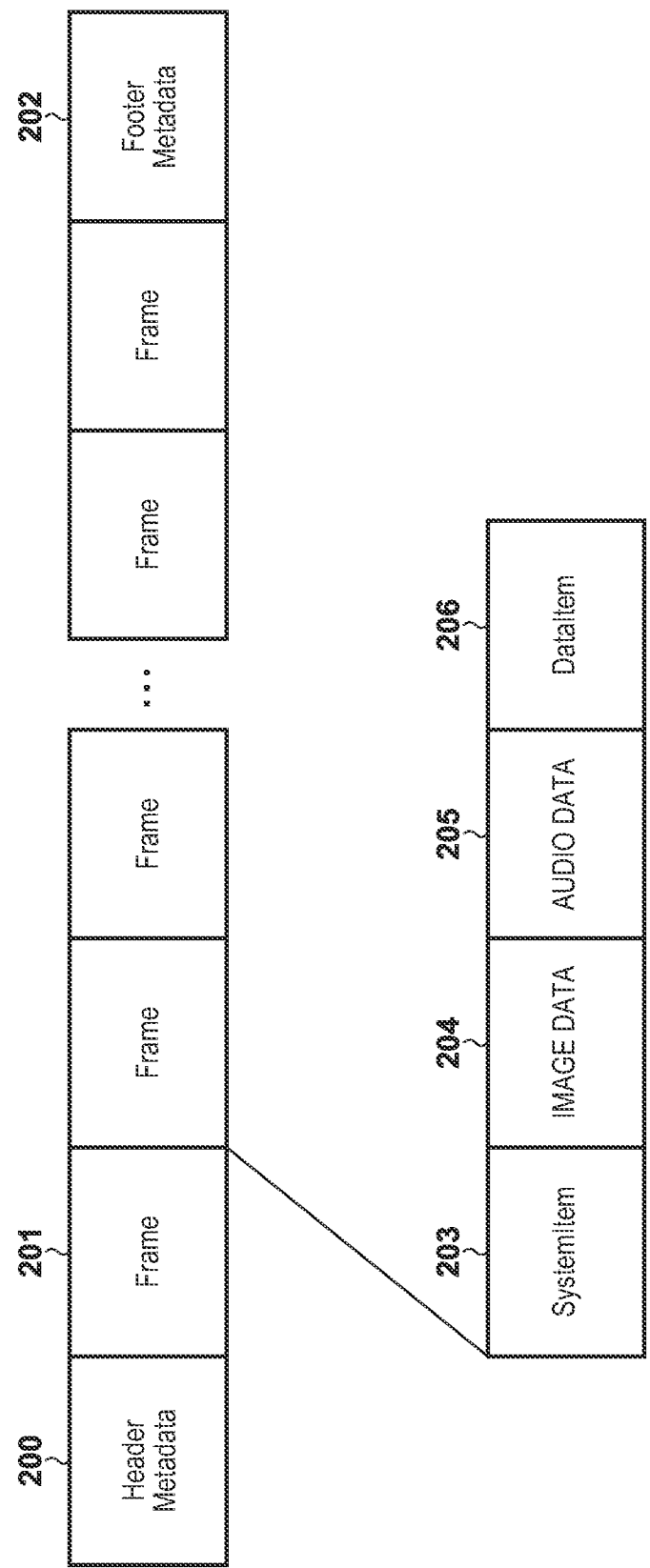

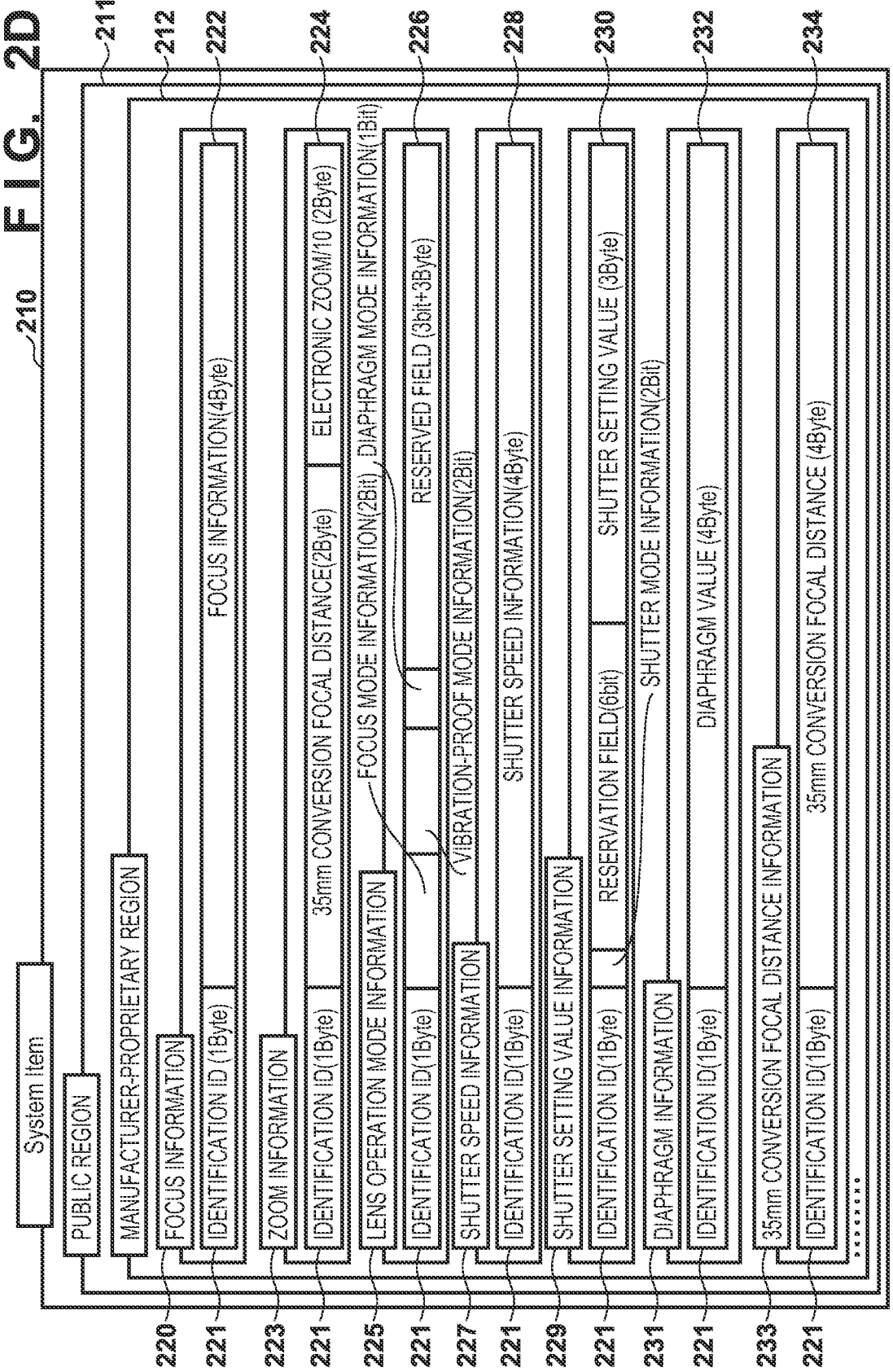

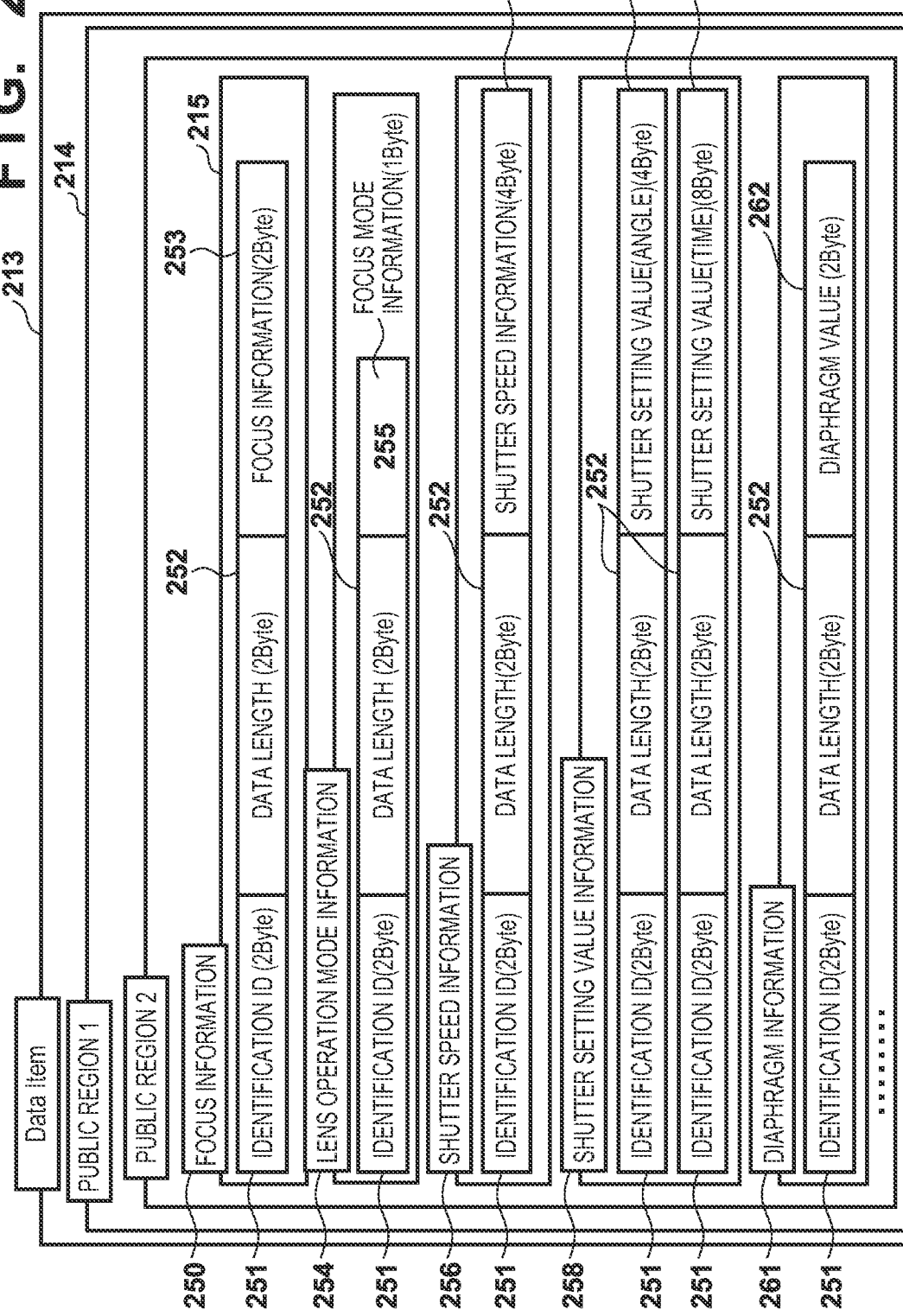

FIG. 2F

| MANUFACTURER-PROPRIETARY REGION OF SystemItem (290) | | PUBLIC REGION 2 OF DataItem (291) | | MANUFACTURER-PROPRIETARY REGION OF DataItem (292) | | |
|---|---|---|---|---|---|---|
| DATA ITEM | DATA SIZE | PRESENCE OR ABSENCE OF SAME DATA DEFINITION | DATA SIZE | PRESENCE OR ABSENCE OF ADD OF DATA DEFINITION | DATA SIZE | REASON |
| FOCUS INFORMATION | 4Byte | PRESENT BUT ACCURATE IS LOW | 2Byte | PRESENT | 4Byte | CAN MAINTAIN SAME DATA REPRESENTATION RANGE TO DATA OF SystemItem, ACCURACY IS HIGH |
| ZOOM INFORMATION; 35mm CONVERSION FOCAL DISTANCE | 2Byte | PRESENT | 2Byte | ABSENT | — | SUBSTITUTE WITH 35mm CONVERSION FOCAL DISTANCE INFORMATION OF SystemItem |
| ZOOM INFORMATION; ELECTRONIC ZOOM/10 | 2Byte | ABSENT | — | PRESENT | 4Byte | ABORT RESULT OF DIVIDING SystemItem DATA BY 10, EXTEND SIZE, IMPROVE ACCURACY OF DATA |
| LENS INFORMATION; FOCUS MODE INFORMATION | 2Bit | PRESENT | 1Byte | ABSENT | — | DO NOT ADD TO PROPRIETARY REGION SINCE ALREADY DEFINED IN DataItem |
| LENS INFORMATION; VIBRATION-PROOF MODE INFORMATION | 2Bit | ABSENT | — | PRESENT | 1Byte | NOT DEFINED IN DataItem; DIFFICULT TO HANDLE IN BITS; CHANGE TO BYTE LENGTH |
| LENS INFORMATION; DIAPHRAGM MODE INFORMATION | 1Bit | ABSENT | — | PRESENT | 1Byte | NOT DEFINED IN DataItem; DIFFICULT TO HANDLE IN BITS; CHANGE TO BYTE LENGTH |
| SHUTTER SPEED INFORMATION | 4Byte | PRESENT | 2Byte | ABSENT | — | DO NOT ADD TO PROPRIETARY REGION SINCE ALREADY DEFINED IN DataItem |
| SHUTTER SETTING VALUE INFORMATION | 4Byte | PRESENT IN PART | 4Byte & 8Byte | PRESENT | 4Byte | NOT DEFINED IN DataItem; ONLY ADD SHUTTER SETTING VALUE (FREQUENCY) TO PROPRIETARY REGION |
| DIAPHRAGM INFORMATION | 4Byte | PRESENT | 2Byte | PRESENT | 4Byte | DEFINED IN BUT USED IN EXISTING PRODUCTS AND APPLICATIONS FOR PURPOSE OF DISPLAYING DIAPHRAGM INFORMATION ON OSD; ADD |
| 35mm CONVERSION FOCAL DISTANCE INFORMATION | 4Byte | PRESENT | 2Byte | PRESENT | 4Byte | CAN MAINTAIN SAME DATA REPRESENTATION RANGE TO DATA OF SystemItem, ACCURACY IS HIGH |

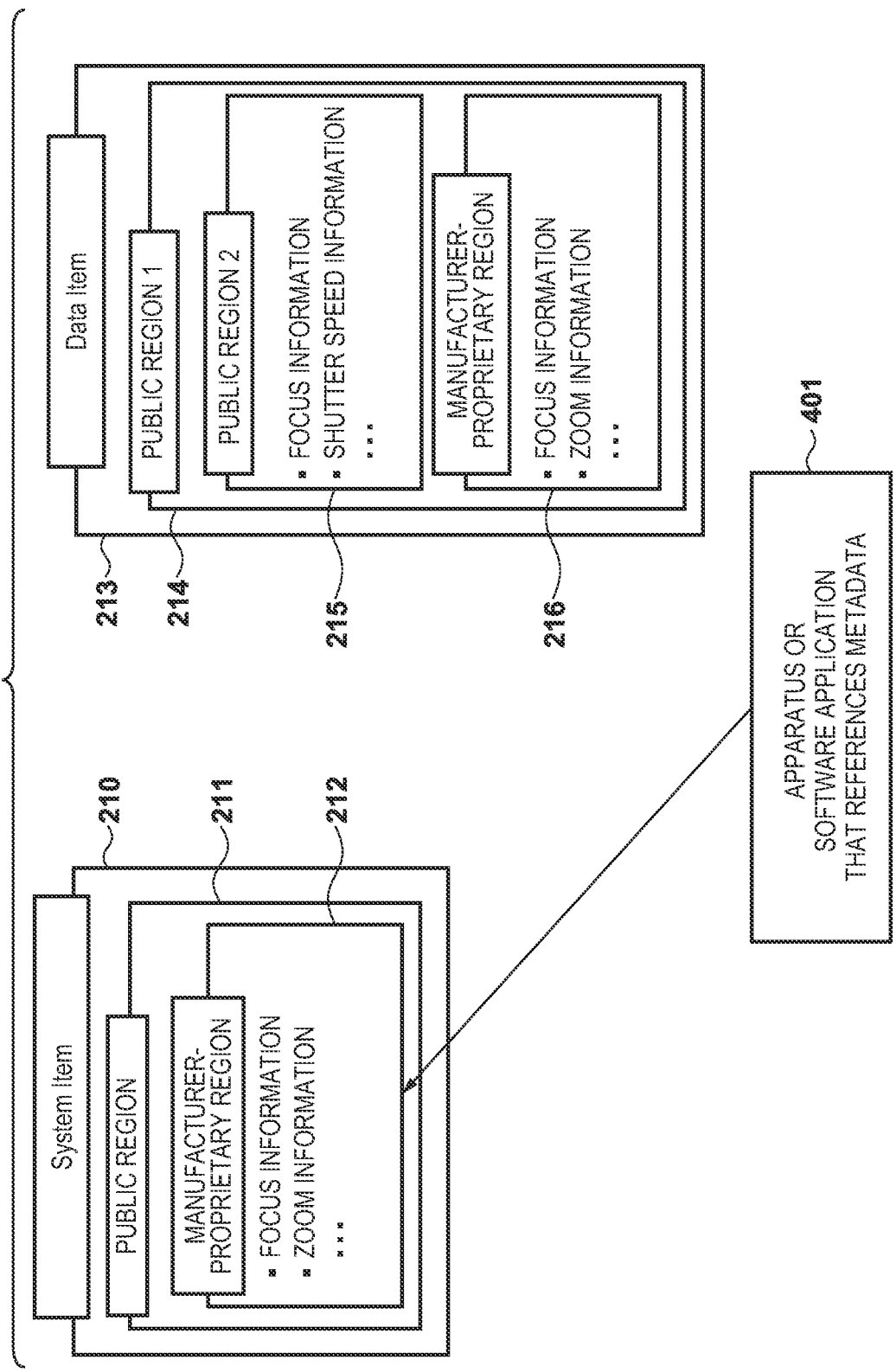

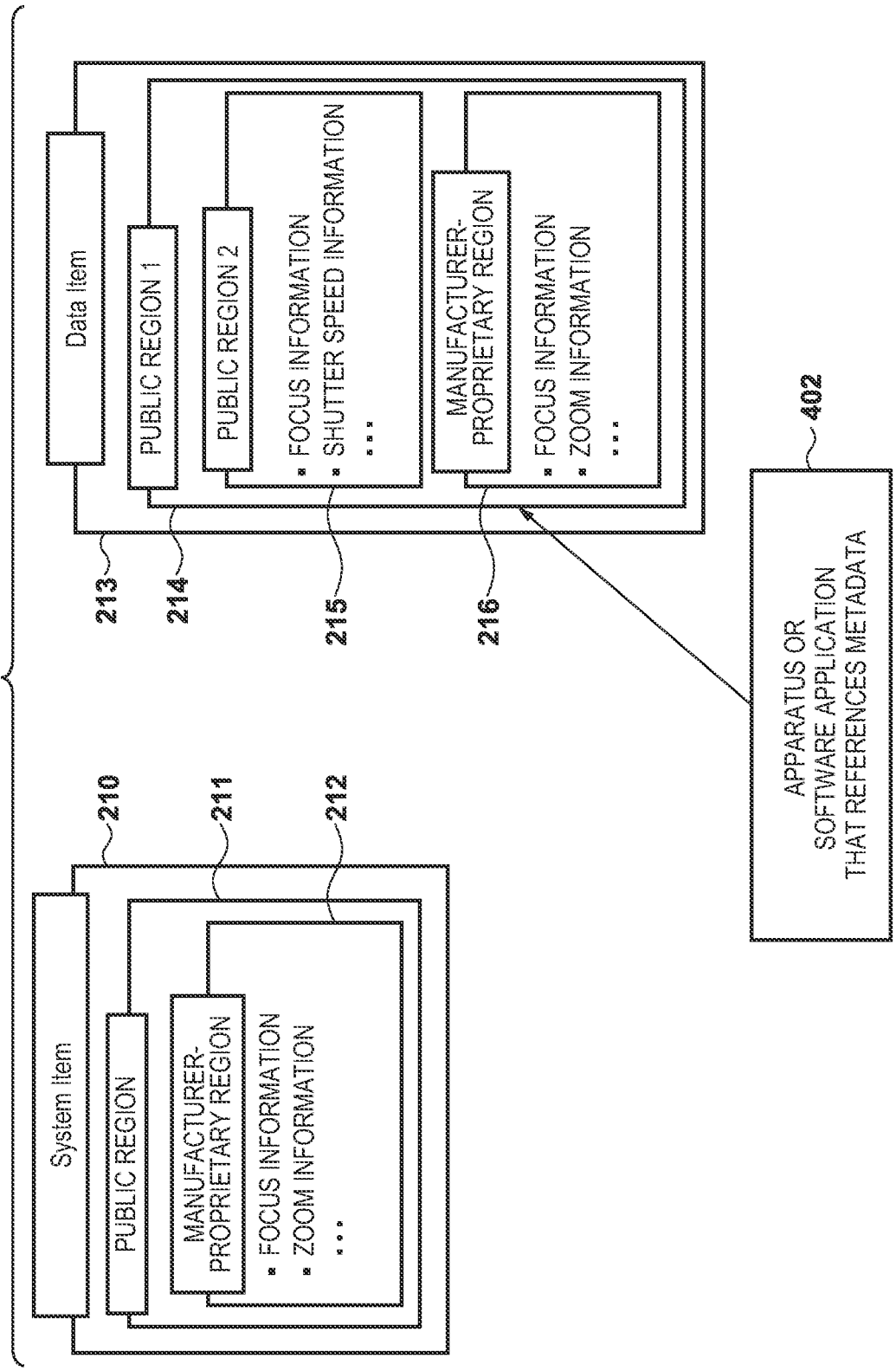

IMAGE CAPTURING APPARATUS, METHOD FOR CONTROLLING THE SAME, AND STORAGE MEDIUM

BACKGROUND OF THE DISCLOSURE

Field of the Disclosure

The present disclosure relates to an image capturing apparatus and a method for controlling the same, and a storage medium.

Description of the Related Art

Currently, devices having a moving image photographing function, such as digital video cameras and smartphones, are widely used. The photographed moving image is recorded as a file on a recording medium as video data with sound in accordance with a moving image format to be recorded. At this time, various kinds of information related to a camera, a lens, and a video called metadata can be added to the file and recorded.

Japanese Patent Laid-Open No. 2020-161954 describes a technique of recording photographing information for each frame having a short period and photographing information for each of a plurality of frames having a long period together with a video, and having a leading frame of the photographing information having a long period as a leading frame of an edited video.

There is a need in the art to maintain compatibility with a device that refers to existing metadata when changing a metadata structure. There is also a need in the art for the ability to record with a common metadata structure in different moving image formats.

SUMMARY OF THE DISCLOSURE

The present disclosure has been contrived in view of the above described circumstances, and provides a technique for recording with a common metadata structure even in different moving image formats while maintaining compatibility with existing devices.

In order to solve the aforementioned issues, one aspect of the present disclosure provides an image capturing apparatus that includes an image capturing unit configured to capture a moving image, the image capturing apparatus comprising: a generation unit configured to generate metadata to be recorded at least in units of frames; and a recording control unit configured to record the metadata generated by the generation unit and a moving image data in one file, wherein the recording control unit performs control such that the metadata having the same content generated by the generation unit is recorded in a plurality of different regions of the one file.

According to the present disclosure, it is possible to perform recording with a common metadata structure even in different moving image formats while maintaining past compatibility with existing devices.

Further features of the present disclosure will become apparent from the following description of exemplary embodiments (with reference to the attached drawings).

BRIEF DESCRIPTION OF THE DRAWINGS

FIG. 2A is a configuration diagram of an MXF file.

FIG. 2D is a detailed metadata configuration diagram of System Item in the MXF file.

FIGS. 2E-1 and 2E-2 are detailed metadata configuration diagrams of Data Item in the MXF file.

FIG. 2F is a correlation diagram of metadata of System Item and Data Item.

FIG. 4A is a configuration diagram in a case where metadata of System Item is referred to.

FIG. 4B is a configuration diagram in a case where metadata of Data Item is referred to.

DESCRIPTION OF THE EMBODIMENTS

Figure 1:
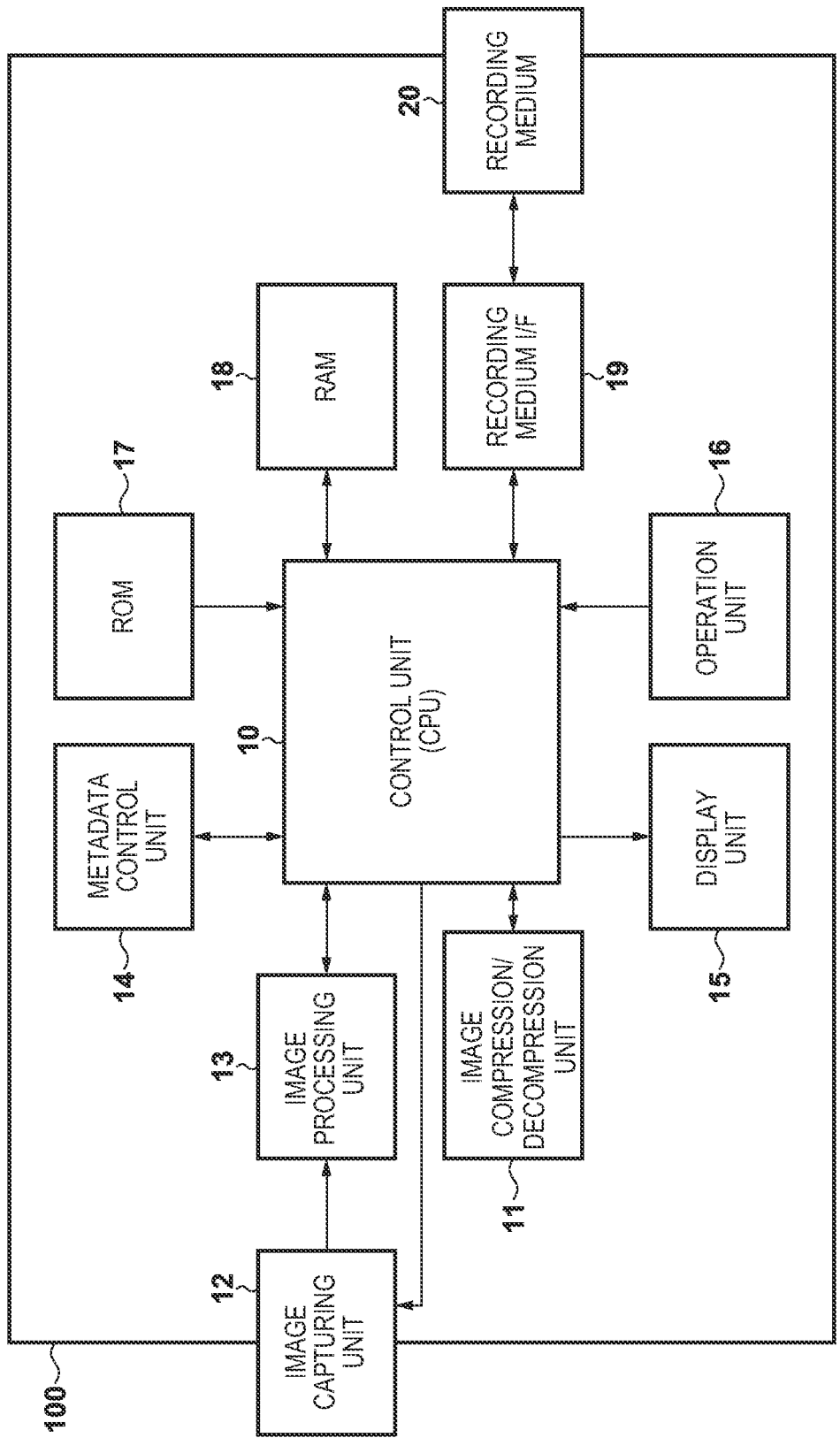
FIG. 1 is a block configuration diagram of an image capturing apparatus in an embodiment.

Hereinafter, embodiments will be described in detail with reference to the attached drawings. Note, the following embodiments are not intended to limit the scope of the present disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

FIG. 1 is a block configuration diagram of an image capturing apparatus represented by a digital camera and a digital video camera to which an embodiment is applied. Note that a device such as a smartphone having a function related to image capturing may be used.

In FIG. 1, an image capturing apparatus 100 includes a control unit 10, an image compression/decompression unit 11, an image capturing unit 12, an image processing unit 13, a metadata control unit 14, a display unit 15, an operation unit 16, a ROM 17, a RAM 18, and a recording medium I/F (19). The control unit 10 and each component can exchange data with each other.

The control unit 10 is a system control unit configured to control the overall system of the digital video camera 100, and includes a CPU and the like. The control unit 10 controls each component by developing a program recorded in the ROM 17 in the RAM 18 and executing the program, and executes a process according to a flowchart to be described below. The ROM 17 is a non-volatile recording medium and stores a program executed by the control unit 10. However, the ROM 17 may be an electrically rewritable element. Typically, it is an EEPROM.

The RAM 18 is a volatile recording medium used as a work memory of the control unit 10. In addition, the RAM 18 is also used as a VRAM for temporarily storing image data captured by the image capturing unit 12 and subjected to image processing by the image processing unit 13 or image data read from the recording medium 20 to subject the image data to compression process or decompression process by the image compression/decompression unit 11 or to display the image data on the display unit 15. Furthermore, the RAM 18 is also used to temporarily store additional information to be recorded in association with the captured image.

A removable recording medium 20 such as an SD card for recording image data can be mounted to the image capturing apparatus 100. For this purpose, the image capturing apparatus 100 includes a recording medium I/F 19 for mounting the recording medium 20. The recording medium I/F 19 is a slot into which a removable recording medium such as a memory card can be inserted. FIG. 1 illustrates an example in which the recording medium 20 is mounted in the recording medium I/F 19. Note that, here, it has been described that the image capturing apparatus 100 has a configuration of recording image data on the removable recording medium 20, but the image data may be recorded in a memory that is not removable and is built in the image capturing apparatus 100.

The image capturing unit 12 includes a photographing lens (including a zoom lens and a focus lens), an image capturing element, and an A/D converter, and is configured to photoelectrically convert an optical image formed on the image capturing element to generate an electric signal, and obtain digital data by the A/D converter. Then, the image capturing unit 12 outputs the obtained digital data as image data (still image, moving image) under the control of the control unit 10.

The image processing unit 13 performs predetermined pixel interpolation, resizing process, and color conversion process on the image data supplied from the image capturing unit 12. Furthermore, the image processing unit 13 performs a predetermined calculation process using the captured image data, and the control unit 10 performs each control (exposure control, automatic white balance control, etc.) regarding image capturing by the image capturing unit 12 based on the obtained calculation result.

The image compression/decompression unit 11 performs a process of compressing (encoding) the image data after the image processing by the image processing unit 13 and a process of decompressing (decoding) the image data read from the removable recording medium 20.

The display unit 15 is a display for displaying various setting states, an image captured by the image capturing unit 12, an image read from the removable recording medium 20 and reproduced, and the like based on the control of the control unit 10. The display unit 15 is configured as a display in a peep type finder, a vari-angle liquid crystal monitor, or the like.

The operation unit 16 includes a power switch for supplying power to the image capturing apparatus 100, a recording start button, a mode switching button that can be switched to a camera mode (photographing mode) or a reproduction mode, and the like. Then, the operation unit 16 receives an operation from the user and notifies the control unit 10 of the operation content. Furthermore, the operation unit 16 may include a touch panel. In this case, the control unit 10 detects the following operation on the touch panel and notifies the control unit 10 of the operation content and coordinates. The operation content includes touching the touch panel with a finger or a pen (hereinafter, referred to as touch-down), being in a state of touching the touch panel with a finger or a pen (hereinafter, referred to as touch-on), and releasing the finger or the pen having touched the touch panel (hereinafter, referred to as touch-off). In the case of a touch-down or touch-on operation, the operation unit 16 notifies the control unit 10 of the operation with the coordinates thereof.

The control unit 10 determines what kind of operation has been performed on the touch panel based on the notified information. For example, for a move operation in which the position changes in the touch-on state, the movement direction of the finger or pen moving on the touch panel can also be determined for each of the vertical components and horizontal components on the touch panel based on the change in the position coordinates. In addition, the control unit 10 can determine that a stroke has been drawn in a case where touch-up is performed on the touch panel from touch-down through a certain move. In particular, an operation of quickly drawing a stroke is called a flick. The flick is an operation of quickly moving a finger on the touch panel by a certain distance while touching the touch panel and releasing the finger as it is, in other words, an operation of quickly tracing the touch panel like flicking with a finger. When it is detected that a move is performed at a predetermined speed or higher for a predetermined distance or longer and touch-up is detected as it is, determination can be made that a flick has been performed. In addition, in a case where it is detected that a move is performed at a speed lower than a predetermined speed for a predetermined distance or longer, the control unit 10 determines that a drag has been performed. As the touch panel, any type of touch panel among various types of touch panels such as a resistive film type, a capacitance type, a surface acoustic wave type, an infrared type, an electromagnetic induction type, an image recognition type, and an optical sensor type may be used.

The metadata control unit 14 generates metadata (time code, recording time, and the like) related to the image data captured by the image capturing unit 12 under the control of the control unit 10. Furthermore, the metadata includes information regarding the photographing lens of the image capturing unit 12 and camera posture information. Then, the metadata control unit 14 stores or calls the metadata in the RAM. Furthermore, the metadata control unit 14 also records metadata in a clip to be recorded on the recording medium 20.

The metadata includes metadata unique for each clip determined at the start of recording (hereinafter, referred to as clip unit metadata) and metadata determined for each frame (hereinafter, referred to as frame synchronization metadata). In addition, the frame synchronization metadata is recorded for one or both of System Item and Data Item according to the standard for each region.

FIG. 2A illustrates a container structure of a material exchange format (MXF). A header 200 indicates the start of the file, and metadata related to the file is recorded. For example, when image data is recorded, metadata such as resolution and frame rate to be recorded is recorded in the region of the header 200. Frame 201 (hereinafter, frame information) represents data of each frame, and includes System Item 203, image data 204, audio data 205, and Data Item 206. The System Item 203 is the frame synchronization metadata including the metadata related to the Data Item 206 from the image data 204. The Data Item 206 is the frame synchronization metadata including metadata such as a time code and lens information whose value is updated for each frame. A footer 202 is information indicating the end of the file.

The frame number is recorded in the System Item 203 region with the start frame as 0. Data Item 206 includes a standard definition metadata region and a manufacturer-proprietary definition metadata region, and information corresponding to each region is recorded.

Figure 2B:
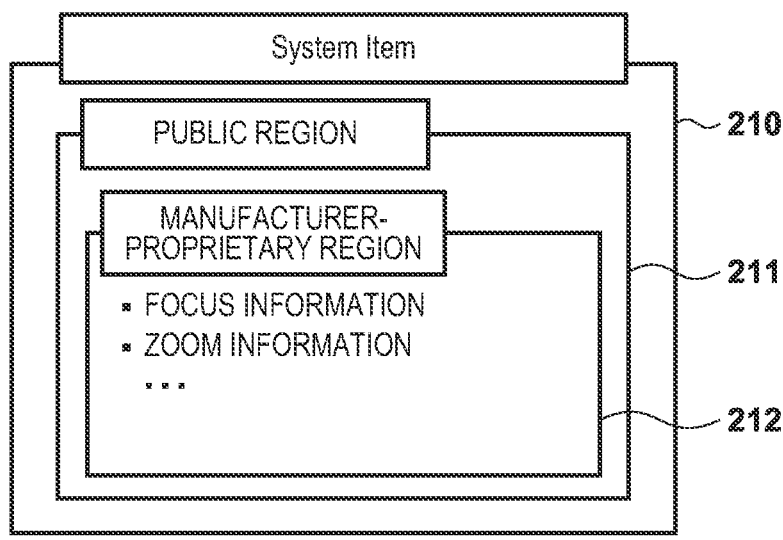
FIG. 2B is a metadata configuration diagram of System Item in the MXF file.

FIG. 2B illustrates an example of metadata recording in the System Item of MXF. The System Item 210 is a metadata structure defined by "Society Of Picture and Television Engineers (SMPTE) 379". A public region 211 is a region in which the data structure is for publication purposes. A manufacturer-proprietary region 212 is a manufacturer-proprietary definition metadata region in the public region 211, and metadata that is various pieces of information regarding the camera, the lens, and the video is recorded in the metadata regions. Therefore, it is possible to define the manufacturer-proprietary region 212 within the range defined in the public region 211. Here, although the focus information and the zoom information are described as examples, this is an example, and the present disclosure is not limited thereto.

Figure 2C:
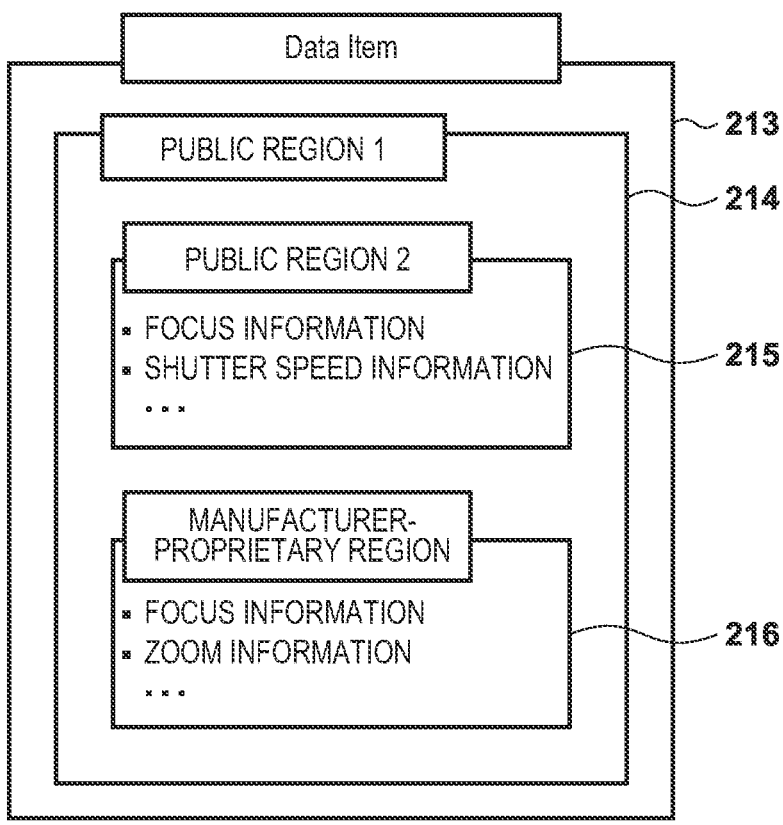
FIG. 2C is a metadata configuration diagram of Data Item in the MXF file.

FIG. 2C illustrates an example of metadata recording in the Data Item of MXF. The Data Item 213 is a metadata structure defined in the "SMPTE 379". A "public region 1" 214 is a region where a data structure is made public, and this public region 1 includes a public region 2 and a manufacturer-proprietary region. A "public region 2" 215 is a region that is within the public region 1 and whose data structure is made public. A manufacturer-proprietary region 216 is a region that is within the public region 1 and is defined uniquely by the manufacturer. In each of these metadata regions, metadata that is various pieces of information regarding the camera, the lens, and the video is recorded. Therefore, it is possible to define the "public region 2" 215 and the manufacturer-proprietary region 216 within the range defined in the "public region 1" 214. Here, although the focus information and the zoom information are described as examples, this is an example, and the present disclosure is not limited thereto. Note that the "public region 2" 215 included in the "public region 1" 214 is a region excluding the manufacturer-proprietary region 216, and thus can also be referred to as a "non-manufacturer-proprietary region".

A detailed recording example of the metadata mainly in the manufacturer-proprietary region 212 in the System Item of MXF is illustrated in FIG. 2D. These pieces of metadata are information related to photographing settings at the time of photographing moving image data (various setting states of the digital video camera at the time of photographing).

The focus information 220 includes an identification ID 221 and a focus information group 222. In the identification ID 221, identification information indicating each piece of information (in the illustrated case, an ID indicating focus information) is recorded. Information representing a focus value is recorded in the focus information group 222.

The zoom information 220 includes an identification ID 221 and a zoom information group 224. 35 mm conversion focal distance information and information representing a value obtained by dividing the electronic zoom by 10 are recorded in the zoom information group 224.

The lens operation mode information 225 includes an identification ID 221 and a lens operation mode information group 226. In the lens operation mode information group 226, focus mode information, vibration-proof mode information, diaphragm mode information, and information representing a reserved region are recorded.

The shutter speed information 227 includes an identification ID 221 and a shutter speed information group 228. In the shutter speed information group 228, information representing shutter speed information is recorded.

The shutter setting value information 229 includes an identification ID 221 and a shutter setting value information group 230. In the shutter setting value information group 230, shutter mode information, information representing a reserved region, and information representing a shutter setting value are recorded.

The diaphragm information 231 includes an identification ID 221 and a diaphragm information group 232. Information representing a diaphragm value is recorded in the diaphragm information group 232.

The 35 mm conversion focal distance information 233 includes an identification ID 221 and a 35 mm conversion focal distance information group 234. Information representing the 35 mm conversion focal distance is recorded in the 35 mm conversion focal distance information group 234.

Figures 2, 2E:
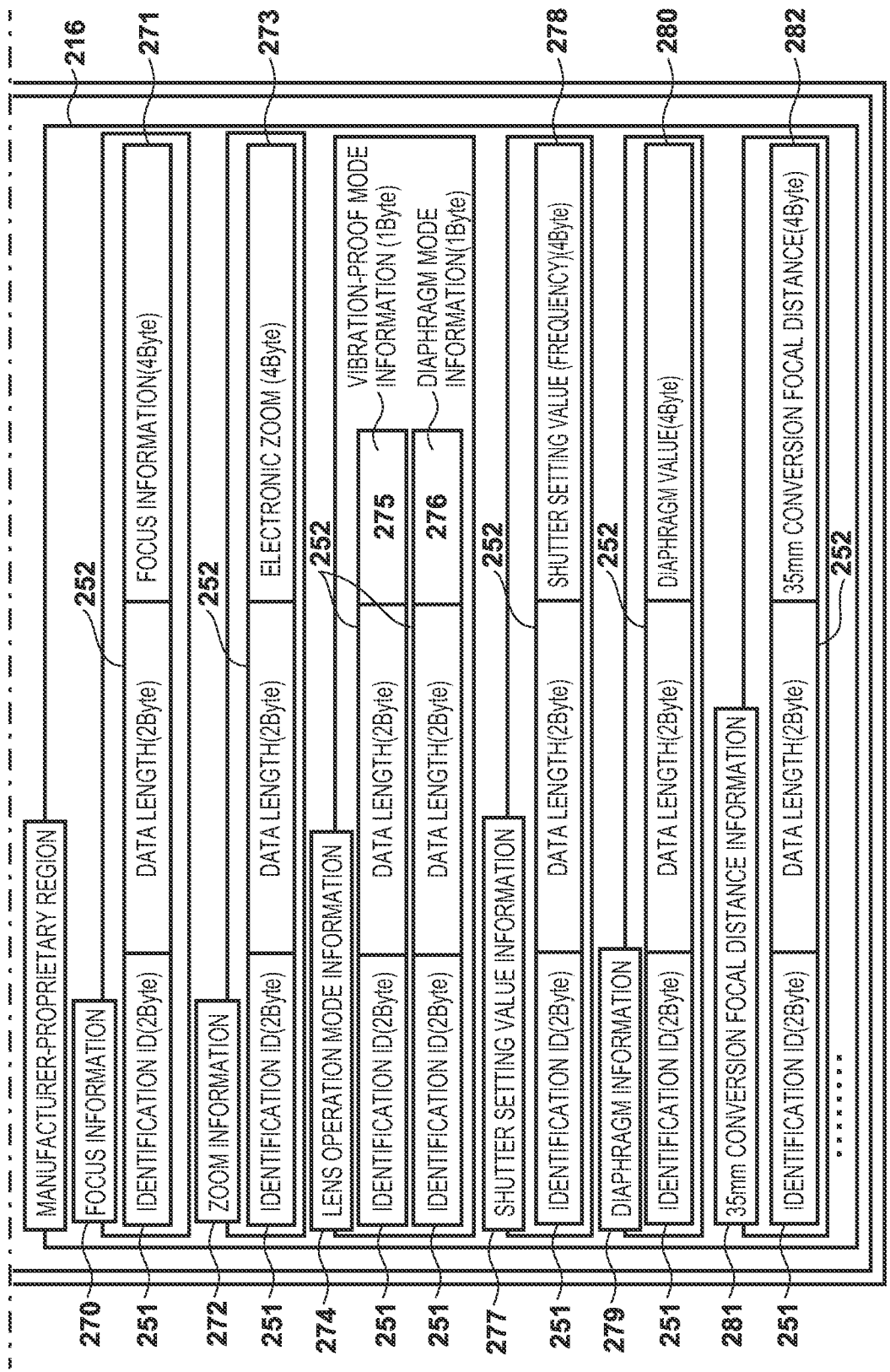

FIGS. 2E-1 and 2E-2 illustrate detailed recording examples of the metadata in Data Item of MXF. First, the metadata record of "public region 2" 214 will be described in detail.

The focus information 250 includes an identification ID 251, a data length 252 of an information group in which actual data is recorded, and a focus information group 253. In the identification ID 251, identification information representing each piece of information (in the illustrated case, an ID indicating focus information) is recorded. Information representing a focus value is recorded in the focus information group 253.

The lens operation mode information 254 includes an identification ID 251, a data length 252 of the information group in which the actual data is recorded, and a lens operation mode information group 255. Information representing focus mode information is recorded in the lens operation mode information group 255.

The shutter speed information 256 includes an identification ID 251, a data length 252 of an information group in which actual data is recorded, and a shutter speed information group 257. Information representing shutter speed information is recorded in the shutter speed information group 257.

The shutter setting value information 258 includes an identification ID 251, a data length 252 of an information group in which actual data is recorded, and a shutter setting value (angle) 259 related to the shutter speed. Similarly, the shutter setting value information 258 includes an identification ID 251, a data length 252 of an information group in which actual data is recorded, and a shutter setting value (time) 260 related to the shutter time.

The diaphragm information 261 includes an identification ID 251, a data length 252 of an information group in which actual data is recorded, and a diaphragm information group 262. Information representing a diaphragm value is recorded in the diaphragm information group 262.

Next, the metadata record in the manufacturer-proprietary region 216 will be described in detail.

In the focus information 270, an identification ID 251, a data length 252 of an information group in which actual data is recorded, and a focus information group 271 are recorded. In the identification ID 251, identification information representing each piece of information (in the illustrated case, an ID indicating focus information) is recorded. Information representing a focus value is recorded in the focus information group 271.

The zoom information 272 includes an identification ID 251, a data length 252 of an information group in which actual data is recorded, and a zoom information group 273. Information representing an electronic zoom value is recorded in the zoom information group 273.

The lens operation mode information 274 includes an identification ID 251, a data length 252 of the information group in which the actual data is recorded, and vibration-proof mode information 275. Furthermore, the lens operation mode information 274 includes an identification ID 251, a data length 252 of the information group in which the actual data is recorded, and a diaphragm mode information 276.

In the shutter setting value information 277, an identification ID 251, a data length 252 of an information group in which the actual data is recorded, and a shutter setting value information group 278 are recorded. Information representing the shutter setting value (frequency) 278 is recorded in the shutter setting value information group 278.

The diaphragm information 279 includes an identification ID 251, a data length 252 of an information group in which actual data is recorded, and a diaphragm information group 280. Information representing the diaphragm value 280 is recorded in the diaphragm information group 280.

In the 35 mm conversion focal distance information 281, an identification ID 251, a data length 252 of an information group in which the actual data is recorded, and a 35 mm conversion focal distance information group 282 are recorded. In the 35 mm conversion focal distance information group 282, information representing a focal distance of 35 mm conversion is recorded.

FIG. 2F illustrates an example of the correlation of the metadata in the manufacturer-proprietary region of the System Item of MXF, the public region 2 of the Data Item, and the manufacturer-proprietary region of the Data Item.

In the manufacturer-proprietary region 290 of the System Item, a data item and a data size recorded in the System Item are described. In a "public region 2" 291 of the Data Item, the presence or absence of the same data definition as that of the System Item and the data size are described. In the manufacturer-proprietary region 292 of the Data Item, presence or absence of data definition addition, a data size, and a reason are described for the manufacturer-proprietary region of the Data Item. Each item will be described below.

The focus information is defined with a data size of 4 bytes in a manufacturer-proprietary region of the System Item. In addition, although the same data definition exists in "public region 2" of the Data Item, the data size is 2 bytes, which is less accurate than the focus information of the System Item. Therefore, in the embodiment, a data size of 4 bytes, which is the same accuracy as that of the System Item, is added to the manufacturer-proprietary region in the public region 1 of the Data Item. The reason for adding is that the data recorded in the manufacturer-proprietary region of the System Item has a larger data size than the data in the public region 2 of the Data Item, the expression range of the focus information is wider, and high accuracy can be recorded.

The 35 mm conversion focal distance of the zoom information is recorded in the manufacturer-proprietary region of the System Item with a data size of 2 bytes. In addition, the same data definition already exists in the public region 2 of the Data Item, and the data size is the same 2 bytes. In other words, both regions are defined with the same accuracy. Therefore, if the metadata is required, the information defined in the public region 2 of the Data Item only need be used, so that the metadata is not added to the manufacturer-proprietary region of the Data Item.

Regarding the electronic zoom of the zoom information, a value obtained by dividing the electronic zoom by 10 with a data size of 2 bytes is recorded in a manufacturer-proprietary region of the System Item. The same data definition does not exist in the public region 2 of the Data Item (undefined). Therefore, in the embodiment, the data definition is added to the manufacturer-proprietary region of the public region 2 of the Data Item, and the data size (accuracy) is 4 bytes. The reason for the addition is that because the data recorded in the manufacturer-proprietary region of the System Item is a value divided by 10, the size of the information to be recorded in the manufacturer-proprietary region of the Data Item is expanded from 2 bytes to 4 bytes so that the information can be recorded with high accuracy without performing a division process.

Regarding the focus mode information of the lens information, information is recorded in a data size of 2 bits in a manufacturer-proprietary region of the System Item. In addition, the same data definition exists in the public region 2 of the Data Item. As a result, it is not necessary to add the data definition with respect to the manufacturer-proprietary region of the Data Item, and the information defined in the public region 2 of the Data Item only need be used.

Regarding the vibration-proof mode information of the lens information, information is recorded in a data size of 2 bits in a manufacturer-proprietary region of the System Item. In addition, the same data definition does not exist in the public region 2 of the Data Item. Therefore, the data definition is added with respect to the manufacturer-proprietary region of the Data Item, and the data size thereof is set to 1 byte. The reason for the addition is that although the data recorded in the manufacturer-proprietary region of the System Item is recorded in 2 bits, the size of the information to be recorded in the manufacturer-proprietary region of the Data Item is extended from 2 bits to 1 byte, and the operation in bytes is easier to handle than the operation in bits.

Regarding the diaphragm mode information of the lens information as well, information is recorded in a data size of 1 bit in a manufacturer-proprietary region of the System Item. In addition, the same data definition does not exist in the public region 2 of the Data Item. Therefore, similarly to the vibration-proof mode information of the lens information, the data definition is added with respect to the manufacturer-proprietary region of the Data Item, and the data size thereof is set to 1 byte. The reason of expansion from 1 bit to 1 byte is because the operation in bytes is easier to handle.

Regarding the shutter speed information, information is recorded in a data size of 4 bytes in a manufacturer-proprietary region of the System Item. In addition, the same data definition exists in the public region 2 of the Data Item. As a result, it is not necessary to add the data definition with respect to the manufacturer-proprietary region of the Data Item, and the information defined in the public region 2 of the Data Item only need be used.

Regarding the shutter setting value information, information is recorded in a data size of 4 bytes in the manufacturer-proprietary region of the System Item. In addition, a part of the same data definition exists in the public region 2 of the Data Item, and another part does not exist. Therefore, in the shutter setting value (angle) or the shutter setting value (time) defined in the public region 2 of the Data Item, it is not necessary to add a data definition with respect to the manufacturer-proprietary region of the Data Item, and the information defined in the public region 2 of the Data Item only need be used. In addition, in the shutter setting value (frequency) that is not defined in the public region 2 of the Data Item, a definition is added as information to be recorded in the manufacturer-proprietary region of the Data Item, and the data size is set to 4 bytes. The reason for the addition is that by defining a shutter setting value (frequency) that is not defined in the public region 2 of the Data Item, information equivalent to the manufacturer-proprietary region of the System Item can be recorded.

Regarding the diaphragm information, information is recorded in a data size of 4 bytes in the manufacturer-proprietary region of the System Item. In addition, the same data definition exists in the public region 2 of the Data Item, and a data size thereof is 2 bytes. However, the information recorded in the public region 2 of the Data Item can express even information with the accuracy of F value 2.81, but the calculation method becomes complicated. Therefore, although the accuracy becomes rough as in the F value 2.8, information of 4 bytes is also recorded in the manufacturer-proprietary region of the Data Item similarly to the information recorded in the manufacturer-proprietary region of the System Item.

Regarding the 35 mm conversion focal distance information, information is recorded in a data size of 4 bytes in the manufacturer-proprietary region of the System Item. In addition, the same data definition already exists in the public region 2 of the Data Item, but the accuracy is lowered since the size of the data is 2 bytes. Therefore, a data definition of 4 bytes is added to the manufacturer-proprietary region of the Data Item, and recording is performed with an accuracy equivalent to the data expression range of the manufacturer-proprietary region of the System Item.

Figure 3A:
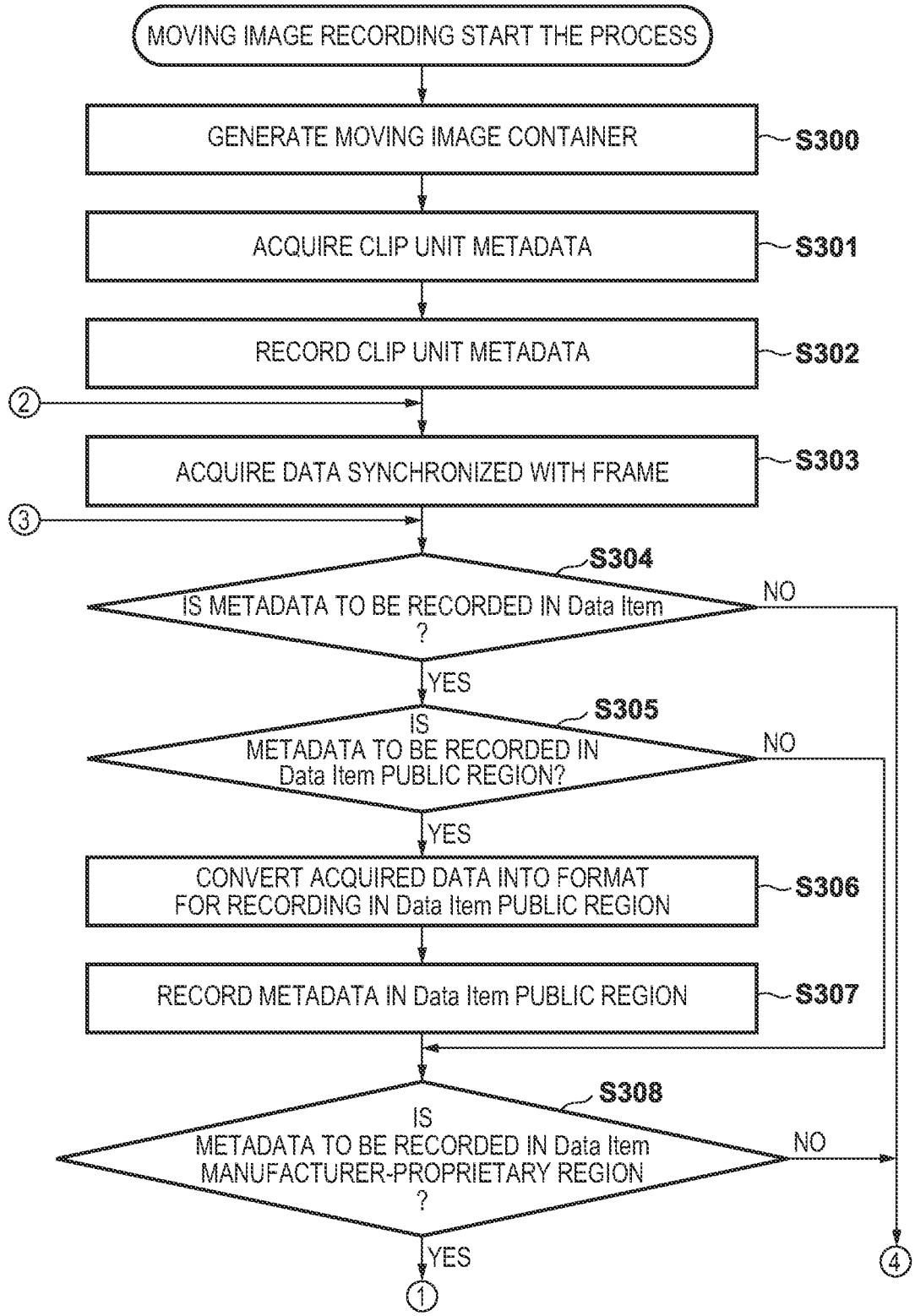
FIGS. 3A and 3B are flowcharts of storing metadata having the same meaning in a plurality of places.
Figure 3B:
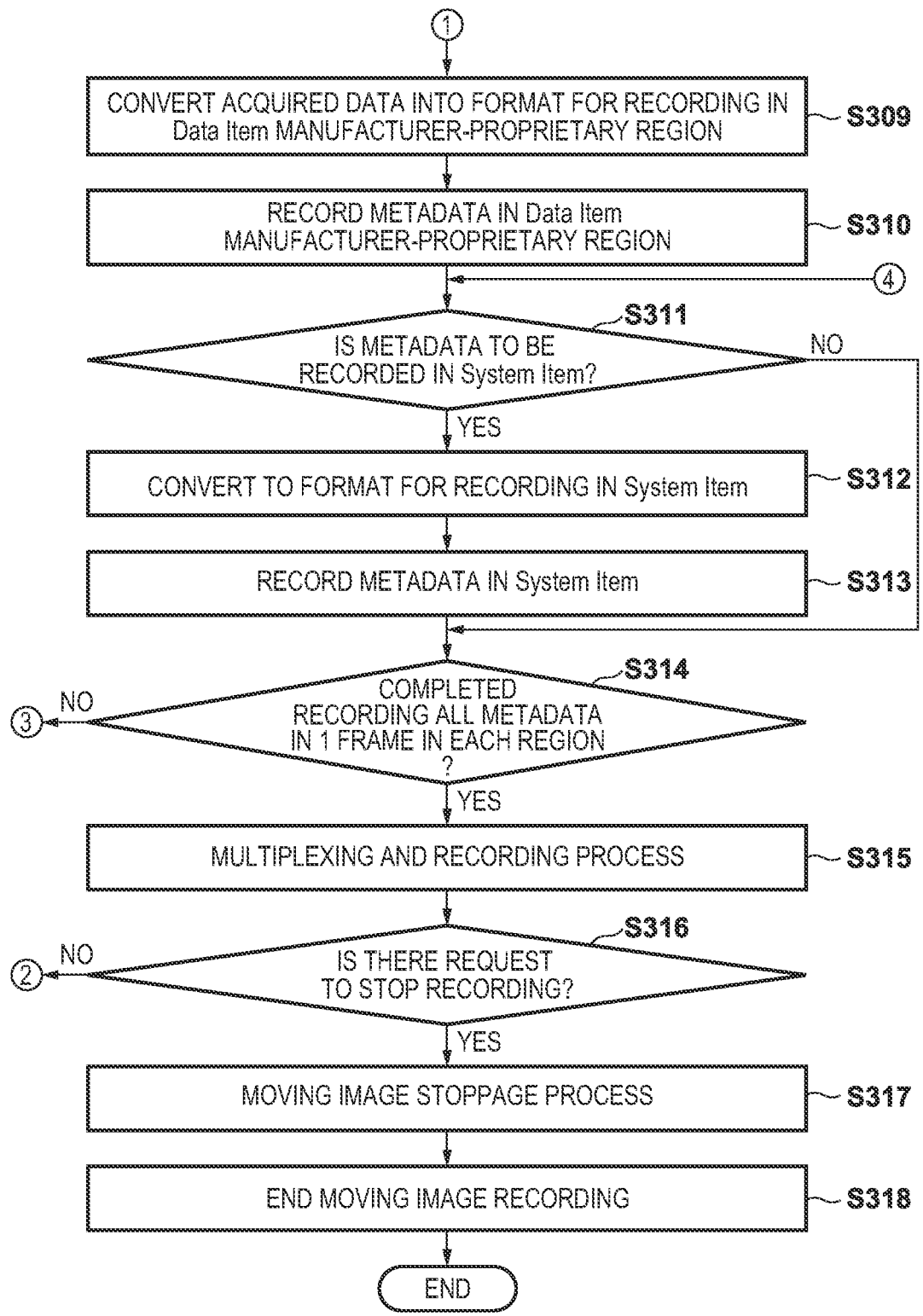

FIGS. 3A and 3B are flowcharts illustrating a moving image recording process related to the MXF format by the control unit 10 of the image capturing apparatus 100 of the present embodiment. More specifically, a process of recording clips in which metadata having the same meaning (type) is recorded in the System Item and the Data Item on the removable recording medium 20 from the start to the end of recording of moving image data is illustrated. In the following description, it is assumed that, when a moving image is recorded, an image captured by the image capturing unit 12 is subjected to various image processing in the image processing unit 13 in units of frames, and compression-encoded in the image compression/decompression unit 11, and the encoded data is stored in the RAM 18. In addition, it is assumed that preset encoding is also applied to audio data acquired from a microphone (not illustrated) and the audio data is stored in the RAM 19. Furthermore, the metadata control unit 14 sequentially stores the metadata generated in synchronization with the frame in the RAM 19. The storage process from the acquisition of the encoded image data and audio data to the RAM and the storage process of the metadata to the RAM are not the main subject of the present application, and thus the description thereof will be omitted.

In S300, the control unit 10 generates (secures) a container of a moving image to be recorded in the RAM 18. Next, in S301, the control unit 10 acquires the clip unit metadata generated by the metadata control unit 14 from the RAM 18. Here, the clip unit metadata may be a clip name, a resolution, or the like, but is not limited thereto. In S302, the control unit 10 records the clip unit metadata acquired in S302 in the region in which the clip unit metadata in the moving image container generated in S300 is recorded.

In step S303, the control unit 10 acquires image data or audio data from the RAM 18 among the data synchronized with the frame, and acquires metadata generated by the metadata control unit 14 (metadata whose value is updated for each frame) from the RAM 18. These operations are repeatedly executed for each frame until a recording stop request is made.

In S304, the control unit 10 determines whether the type of metadata acquired from the metadata control unit 14 in S303 indicates the metadata to be recorded in the Data Item. Then, in a case where determination is made as the metadata of the type to be recorded in the Data Item, the control unit 10 proceeds the process to S305. In S305, the control unit 10 determines whether the type of metadata acquired by the metadata control unit 14 is metadata to be recorded in the public region of the Data Item. Then, in a case where determination is made that the type of the acquired metadata is metadata to be recorded in the public region of the Data Item, the control unit 10 causes the process to proceed to S306. In S306, the control unit 10 converts the metadata into a format for recording the metadata in the public region of the Data Item. Then, in S307, the control unit 10 records the metadata obtained by the conversion in S306 in the public region of the Data Item secured in the RAM 18.

In step S308, the control unit 10 determines whether the metadata acquired by the metadata control unit 14 is metadata to be recorded in the manufacturer-proprietary region. In a case where determination is made that the acquired metadata is metadata to be recorded in the manufacturer-proprietary region, the control unit 10 causes the process to proceed to S309. In S309, the control unit 10 converts the acquired metadata into a format to be recorded in the manufacturer-proprietary region of the Data Item. Then, in S310, the control unit 10 records the metadata obtained by the conversion in S309 to the manufacturer-proprietary region of the Data Item secured in the RAM 18.

In S311, the control unit 10 determines whether the metadata acquired by the metadata control unit 14 is the metadata to be recorded in the System Item. In a case where determination is made that the acquired metadata is determined as metadata to be recorded in the System Item, the control unit 10 causes to proceed to the process to S312. In S312, the control unit 10 converts the acquired metadata into a format to be recorded in the System Item. Then, in S313, the control unit 10 records the metadata obtained by the conversion in the System Item secured in the RAM 18.

In S314, the control unit 10 determines whether or not the recording of all the pieces of metadata acquired in one frame in each region is completed. In a case where determination is made that the recording of all the pieces of metadata acquired in one frame in each region is not completed, the control unit 10 returns the process to S304. On the other hand, in a case where determination is made that the recording of all the pieces of metadata acquired in one frame in each region is completed, the control unit 10 causes the process to proceed to S315. In S315, the control unit 10 multiplexes the image data and audio data for one frame stored in the RAM 18 and the metadata (data of System Item and Data Item) generated as described above, and records the multiplexed metadata in the recording medium 20. Then, in S316, the control unit 10 determines whether or not a recording stop request has been made from the operation unit 16, that is, whether or not the user has performed a recording stop operation of the moving image. In a case where determination is made that the recording stop request has been received, the control unit 10 causes the process to proceed to S317. In step S317, the control unit 10 stops the recording of the moving image and performs necessary processes such as footer recording when the recording of the moving image is stopped. Then, in S318, the control unit 10 generates FooterMetaData representing the end of the container and records the FooterMetaData in the recording medium 20. On the other hand, in a case where determination is made that the recording stop request has not been received in S316, the control unit 10 returns the process to S303 and performs the recording process of the next frame.

In the above description, each time data for one frame (System Item, image data, audio data, and Data Item) is generated, it is recorded on the recording medium, but it may be stored in an output buffer and recorded on the recording medium when a certain amount of data is accumulated in the output buffer.

Next, an apparatus or a software application that refers to metadata information recorded in the System Item or the Data Item will be described with reference to FIGS. 4A and 4B.

FIG. 4A illustrates an example of an apparatus or software application 401 that refers to metadata of the manufacturer-proprietary region of the System Item. This is an example of a case where a general image capturing apparatus or software application released on the market refers to the manufacturer-proprietary region of the System Item and performs information display and control. A general image capturing apparatus can refer only to the manufacturer-proprietary region of the System Item. Therefore, if the manufacturer-proprietary region of the System Item is eliminated and only the metadata information recorded in the Data Item is used, there is a possibility that the general image capturing apparatus or software application cannot be correctly controlled.

FIG. 4B illustrates an example of an apparatus or software application 402 that refers to the metadata of the public region 1, the public region 2, and the manufacturer-proprietary region of the Data Item. In a case where the metadata information recorded in the Data Item is grasped in advance, such as the image capturing apparatus 100 of the present embodiment (or the apparatus after updating the firmware) or a future software application (or an application after updating), information display and control can be performed with reference to only the metadata of the Data Item.

From FIGS. 4A and 4B, in a case where the metadata information is recorded in the region of the System Item or the Data Item and used in the metadata structure of the common Data Item in each moving image format, the common metadata structure can be recorded in each moving image format while maintaining the compatibility of the existing metadata structure including the existing product, software application, future product, and software application.

Although the present disclosure has been described in detail based on the embodiments, the present disclosure is not limited to these specific embodiments, and various forms within a scope not deviating from the gist of the present disclosure are also included in the present disclosure. A part of the aforementioned embodiments may be combined as appropriate.

In addition, the present disclosure also includes a case where a program of software that realizes the functions of the embodiment described above is supplied from a recording medium directly or by using wired/wireless communication to a system or an apparatus having a computer that can execute the program, and the program is executed.

Note that, in the embodiment described above, a case where the present disclosure is applied to an image capturing apparatus such as a digital video camera has been described as an example, but this example is not the sole case. That is, the present disclosure may be applied to any device with an image capturing element. That is, the present disclosure is applicable as long as an apparatus can capture an image, such as a mobile phone terminal, a portable image viewer, a television with a camera, a digital photo frame, a music player, a game machine, or an electronic book reader.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-046967, filed Mar. 23, 2023 which is hereby incorporated by reference herein in its entirety.

What is claimed is:

1. An image capturing apparatus that includes an image capturing unit configured to capture a moving image, the image capturing apparatus comprising:
   a generation unit configured to generate metadata to be recorded at least in units of frames; and
   a recording control unit configured to record the metadata generated by the generation unit and a moving image data in one file having a container structure of material exchange format (MXF),
   wherein the recording control unit performs control such that the metadata having the same content generated by the generation unit is recorded in both a System Item region and a Data Item region of the one file,
   wherein the recording control unit performs control such that, in a case where the type of metadata of interest generated by the generation unit is defined as the type to be stored in the manufacturer-proprietary region of the System Item region and is not defined in a first region intended to make public a public region in the Data Item region, the metadata of interest is recorded in each of a manufacturer-proprietary region of the System Item region and a second region for storing manufacturer-proprietary information of the public region in the Data Item region, and
   wherein in a case where the type of metadata of interest generated by the generation unit is defined in both the manufacturer-proprietary region of the System Item region and the first region of the public region in the Data Item region, and a defined accuracy of the manufacturer-proprietary region of the System Item region is higher than an accuracy defined in the first region, the recording control unit performs control such that the metadata of interest is recorded at an accuracy in the manufacturer-proprietary region of the System Item region in the second region of the public region in the Data Item region.

2. The image capturing apparatus according to claim 1, wherein the recording control unit performs control such that the metadata having the same content is recorded in both a manufacturer-proprietary region and a public region.

3. The image capturing apparatus according to claim 1, wherein the recording control unit performs control such that the metadata having the same content is recorded in both the manufacturer-proprietary region of the System Item region and the public region intended to make public the Data Item region.

4. The image capturing apparatus according to claim 1, wherein the generation unit generates information regarding a photographing setting of the moving image data as the metadata.

5. The image capturing apparatus according to claim 1, wherein in a case where the type of the metadata of interest generated by the generation unit is defined in both the manufacturer-proprietary region of the System Item region and the first region of the public region of the Data Item region and the accuracies in these two regions are the same, the recording control unit performs control such that the metadata of interest is not recorded in the second region of the public region of the Data Item region.

6. The image capturing apparatus according to claim 1, wherein the recording control unit includes a conversion unit configured to convert the metadata generated by the generation unit into a format corresponding to a storage region, and the metadata obtained by conversion by the conversion unit is stored in a corresponding region.

7. A non-transitory computer-readable storage medium comprising instructions for performing the method of controlling an image capturing apparatus that includes an image capturing unit configured to capture a moving image, the method comprising:

generating metadata to be recorded at least in units of frames; and recording the metadata generated in the generating and the moving image data in one file having a container structure of material exchange format (MXF), wherein the recording includes performing control such that the metadata having the same content generated in the generating is recorded in both a System Item region and a Data Item region of the one file, wherein the recording includes performing control such that, in a case where the type of metadata of interest generated in the generating is defined as the type to be stored in the manufacturer-proprietary region of the System Item region and is not defined in a first region intended to make public a public region in the Data Item region, the metadata of interest is recorded in each of a manufacturer-proprietary region of the System Item region and a second region for storing manufacturer-proprietary information of the public region in the Data Item region, and wherein in a case where the type of metadata of interest generated in the generating is defined in both the manufacturer-proprietary region of the System Item region and the first region of the public region in the Data Item region, and a defined accuracy of the manufacturer-proprietary region of the System Item region is higher than an accuracy defined in the first region, the recording includes performing control such that the metadata of interest is recorded at an accuracy in the manufacturer-proprietary region of the System Item region in the second region of the public region in the Data Item region.

* * * * *